United States Patent [19]

Crisler et al.

[11] Patent Number: 5,142,533
[45] Date of Patent: Aug. 25, 1992

[54] METHOD FOR CONTROLLING THE SCHEDULING OF MULTIPLE ACCESS TO COMMUNICATION RESOURCES

[75] Inventors: Kenneth J. Crisler, Wheaton; Michael L. Needham, Palatine, both of Ill.

[73] Assignee: Motorola, Inc., Schaumburg, Ill.

[21] Appl. No.: 676,653

[22] Filed: Mar. 28, 1991

[51] Int. Cl.⁵ .............................................. H04J 3/16
[52] U.S. Cl. ................................. 370/95.1; 370/85.2
[58] Field of Search ................... 370/95.1, 85.2, 87.7, 370/95.3, 104.1

[56] References Cited

U.S. PATENT DOCUMENTS 4,774,707  9/1988  Raychaudhuri ................. 370/85.2
4,888,765  12/1989  Dyke ............................... 370/95.1

OTHER PUBLICATIONS

"Packet Reservation Multiple Access for Local Wireless Communications", Goodman et al., IEEE publication, pp. 701-706 (1988).
Multiple Access Protocols for Data Communications via VSAT Networks, Wolejsza et al., IEEE Communications Magazine, pp. 30-39 (1987).
Performance Analysis of Virtual Time CSMA, Meditch et al., IEEE Publication, pp. 242-251 (1986).
Virtual Time CSMA: Why Two Clocks Are Better Than One, Molle et al., IEEE Transactions on Communications, pp. 919-933 (Sep. 1985).
Multiaccess Protocols in Packet Communication Systems, Tobagi, IEEE Transactions On Communications, pp. 468-488 (Apr. 1980).
On Protocols For Satellite Packet Switching, Lam, IEEE Publication, pp. 58.6.1-58.6.6 (1979).
An Analysis of the Reservation-ALOHA Protocol for Satellite Packet Switching, Lam, IEEE Publication, pp. 27.3.1-27.3.5 (1978).

Primary Examiner—Douglas W. Olms
Assistant Examiner—Min Jung
Attorney, Agent, or Firm—Steven G. Parmelee

[57] ABSTRACT

A method of providing a communication unit (10) access to a shared communication resource. In the communication unit, a clock (123) is maintained, and the unit detects the time when an inhibit period on the shared communication resource begins, and the time at which it concludes. When access to the shared communication resource is desired, the unit attempts to access the communication resource based on the time at which access was desired, as well as the times at which a detected inhibit condition began and concluded. A virtual time clock runs only during non-inhibit periods. Access to the communication resource is then based on when the virtual time clock equals the desired access time.

13 Claims, 6 Drawing Sheets

METHOD FOR CONTROLLING THE SCHEDULING OF MULTIPLE ACCESS TO COMMUNICATION RESOURCES

FIELD OF THE INVENTION

This invention relates generally to communication systems, including but not limited to methodologies that control access by a plurality of competing communication units to limited communication resources.

BACKGROUND OF THE INVENTION

Multiple access communication systems are well understood in the art. Multiple access communication systems are designed to provide access to limited communication resources for a plurality of communication units for the purpose of transmitting communication messages, referred to as packets. The access methodology, referred to as a multiple access protocol, is chosen such that some appropriate set of performance constraints are met. Typical performance constraints include efficiency of communication resource use, communication message delay, and other similar factors. Multiple access protocols can be regarded as belonging to one of two general types, contention and non-contention.

Non-contention protocols are designed such that a communication unit desiring to send a packet is permitted exclusive use of a communication resource. One example of this type of protocol is time-division multiple access (TDMA) where the communication resource is divided into a plurality of time frames that are further subdivided into a plurality of time slots and each communication unit is assigned exclusive use of one or more time slots in each time frame.

Contention protocols are characterized by communication units that actively compete with each other to gain access to the communication resource. The slotted ALOHA protocol is an example of this type of protocol. In slotted ALOHA, a communication resource is divided into a plurality of time slots. A communication unit desiring to send a packet may transmit in a first subsequent time slot, taking care not to transmit outside of the boundaries of that time slot. If no other communication unit transmitted in that time slot, the packet transmission is considered successful. If, however, one or more other communication units transmitted a packet in the same time slot, the transmission will usually fail due to collision.

Reservation protocols, a sub-class of contention protocols, are also known. Reservation protocols attempt to combine certain aspects of contention and non-contention protocols to provide improved performance for a wider variety of communication system conditions. In one particular reservation protocol, the Reservation-ALOHA (R-ALOHA) protocol, like TDMA, the communication resource is divided into time frames that are further divided into time slots. When the communication resource is unused, the protocol operates similarly to slotted ALOHA. When a communication unit desires to send a packet, it transmits in one of the unused time slots, referred to as a random access slot. If the transmission is successful, i.e., it does not collide with another transmission, the communication unit is permitted exclusive use of the same time slot in subsequent time frames, referred to as reserved access slots, until the packet is completely transmitted. Thus the initial ALOHA transmission results in a subsequent reservation of a communication resource. Note that some method of feedback to the communication units regarding the success or failure of initial ALOHA transmissions is necessary in order for this protocol to be effective.

R-ALOHA is quite efficient for communication systems accommodating a wide variety of packet frequencies and sizes. Note, however, that when the communication resource in an R-ALOHA system is in the reserved state, the transmission of random access packets is inhibited for all communication units desiring to access the resource. Random access packets are held pending the release of the resource. Once the resource returns to the random access state, the units may transmit any pending random access packets.

If all the waiting units access the resource as soon as the resource becomes available, the packets will all collide, with no transmission being successful. It is therefore generally beneficial to not have all the units with pending random access packets transmit as soon as the resource is available. One method that may be used to reduce the likelihood of collisions is to have all units wait a random time after the channel becomes available before transmitting. This method contributes to higher overall delays in the delivery of the packets. Furthermore, the delays incurred are not necessarily fairly distributed. That is, a unit that had a packet it wished to send early on during the time the resource was in a reserved state might have to wait for a long random delay after the resource becomes available, while a packet from another later unit might have little or no delay, based on the random delays chosen. Access to the resource does not occur on a first-come, first-served basis. The overall effect is a large variation in the delivery delays of packets, with the relative delays experienced by different communication units being unrelated to the actual order in which their packets were generated.

Accordingly, a need exists for a multiple access method that provides increased utilization of a communication resource by a plurality of communication units with widely varying communication requirements, and that provides a more fair ordering of access to the communication resource by the plurality of communication units.

SUMMARY OF THE INVENTION

Briefly, according to the invention, a method of providing a communication unit access to a shared communication resource is disclosed herein. In the communication unit, a clock is maintained. The unit detects that an inhibit condition on the communication resource will subsequently occur, and then determines the time at which the inhibit period begins, and the time at which it concludes. When access to the shared communication resource is desired, the unit attempts to access the communication resource based on the time at which access was desired, as well as the times at which a detected inhibit condition began and concluded.

DESCRIPTION OF A PREFERRED EMBODIMENT

Figure 1:
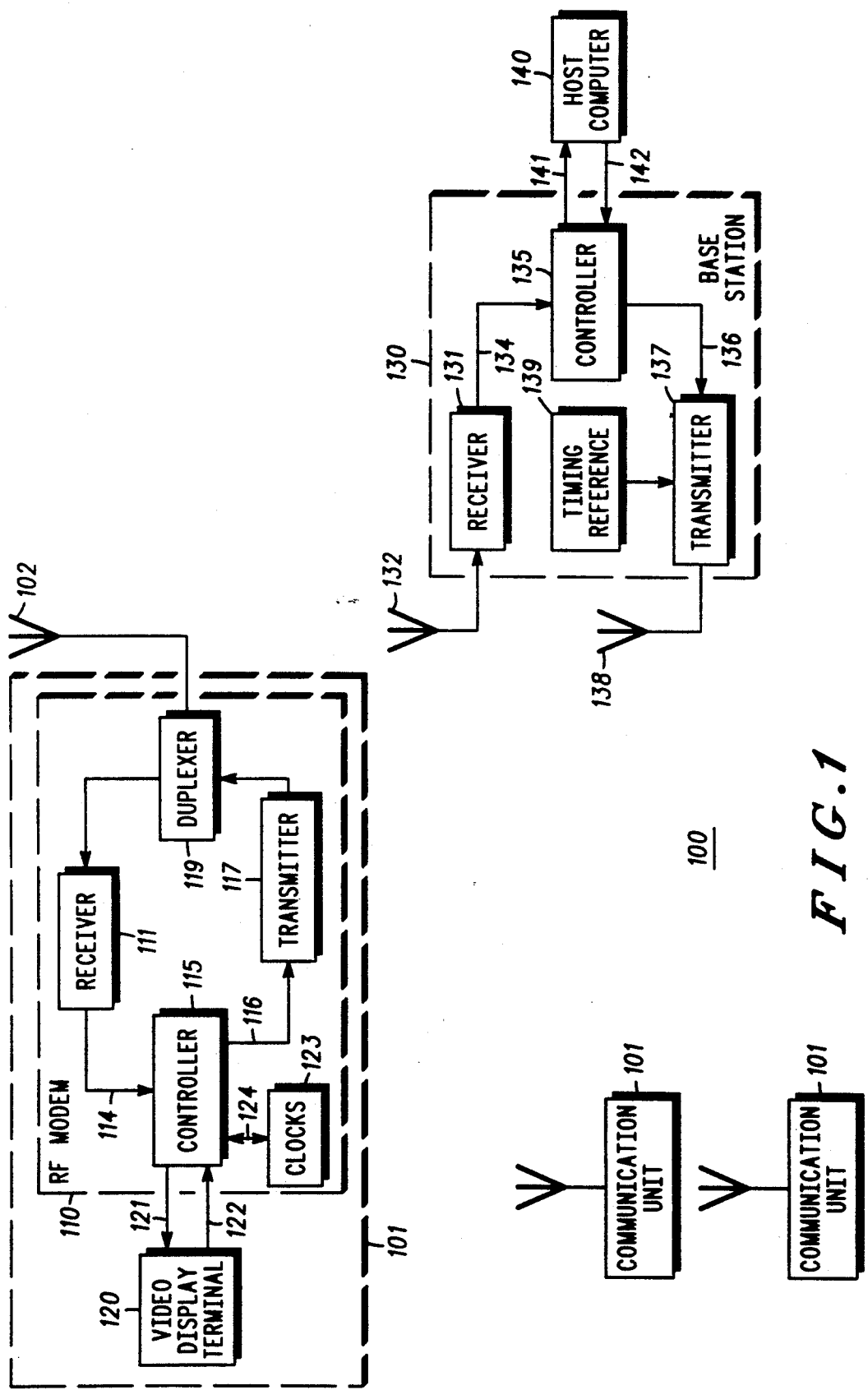
FIG. 1 comprises a block diagram of a communication system utilizing the principles of the present invention.

Referring to FIG. 1, a block diagram of a communication system exemplifying the principles of the present invention can be seen as generally depicted by the numeral 100. The communication system (100) provides for radio frequency (RF) communications between a plurality of communication units (101) and a base station (130). The base station (130) connects to a host computer (140), to which communication messages from the communication units (101) are delivered and from which communication messages directed to the communication units (101) are accepted. A typical communication unit (101) is comprised of a video display terminal (120) and an RF modem (110). The user of the communication unit (101) interacts with the video display terminal (120) (or other input device, as understood in the art) to exchange data messages with the host computer (140). The RF modem (110) operates to appropriately process the communication messages for exchange with the base station (130).

As depicted in FIG. 1, the communication units (101) are mobile and communicate with the base station (130) via a radio frequency (RF) communication channel. Those of appropriate skill in the art should appreciate that the present invention may be applied to any communication system where a plurality of communication units share a common communication channel; for example a local area network (LAN). Accordingly, the communication system (100) operates to exchange communication messages between the plurality of communication units (101) and a host computer (140) via a common communication medium.

The communication messages within the communication system (100) comprise inbound (towards the host computer) and outbound (from the host computer) information and control packets, which are communicated on the RF communication channel. The information contained in the communicated packets may comprise any appropriately formatted data. As described herein, an RF communication channel comprises a pair of radio spectrum bands, appropriately separated in frequency, such that one band is utilized for inbound communications and the other band is utilized for outbound communications. In the preferred embodiment, the RF communication channel is divided using time division multiplexing (TDM) into a plurality of time slots. The time slots may be reserved for use by the communication units. When the inbound communication channel is not currently reserved, a communication unit may transmit unreserved information packets or random access packets that include control packets to secure reservations for exclusive use of subsequent inbound time slots for transmission of information packets. (An unreserved information packet is a self-contained data message transmitted without a reservation.)

Outbound communication packets are suitably formatted for RF transmission at the base station (130) and transmitted to the communication units (101) via the outbound RF communication channel. Since packets traversing this communication path have only one source, the host computer (140), the packets are transmitted by the base station (130) without contention.

The RF modem (110) includes an RF receiver (111) that couples to an appropriate antenna (102) via a duplexer (119) to receive RF communication signals and provide a received signal (114). A controller (115) operates on the received signal (114) in a known manner to separate the user and control data portions of the received signal (114). The user data signal (121) is applied to the video display terminal (120), which processes the user data signal for display to the user.

Transmit user data (122) from the video display terminal (120) is applied to the controller (115). A clock (123) provides a clock signal (124) that the controller (115) uses to note the time at which the transmit user data (122) was applied to the controller and also the times during which the communication channel is reserved. The controller (115) operates in a manner to be described later to control transmission of the user data (122) according to the information contained in the control data portion of the received signal (114) previously applied to the controller (115), and, in the random access case, according to the time at which the user data (122) was applied to the controller. The controller (115) appropriately formats the transmit user data (122) and adds appropriate control data to provide the transmit signal (116). The transmit signal (116) is applied to a well known RF transmitter (117) that appropriately modulates and amplifies the transmit signal (116) for transmission by the antenna (102) via the duplexer (119).

The base station (130) includes an RF receiver (131) that couples to an appropriate receive antenna (132) to receive RF communication signals and provide a received signal (134) to the controller (135). The controller (135) operates on the received signal (134) in a known manner to separate the user and control data portions of the received signal (134). As will be described later, the control data portion of the received signal (134) is processed by the controller to provide a return control data signal for transmission to the RF modem (110). The user data signal (141) is applied to the host computer (140). A transmit user data signal (142) from the host computer (140) is applied to the controller (135). The controller (135) combines appropriate transmit control data with the transmit user data (142) to form the transmit signal (136) applied to the RF transmitter (137). The transmitter (137), being synchronized by a timing reference (139), appropriately modulates and amplifies the transmit signal (136) for transmission by an appropriate transmit antenna (138).

Figure 2A:
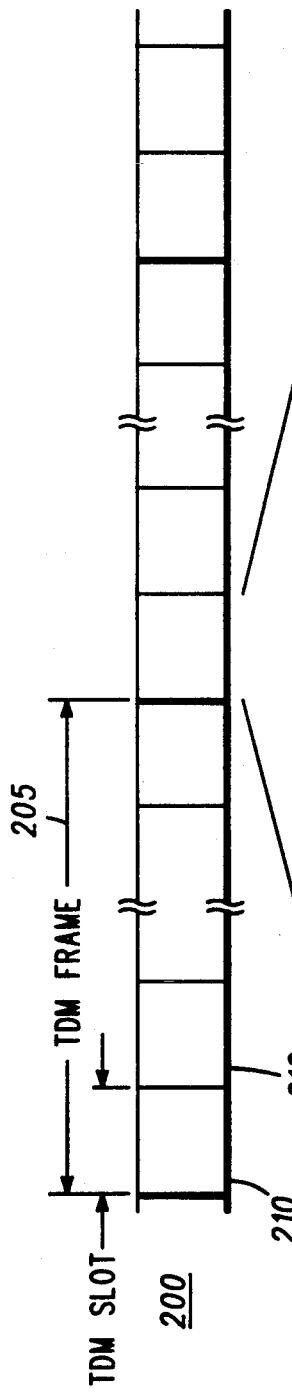
FIGS. 2A, 2B, and 2C show a channel format of the communication system of FIG. 1 utilizing the principles of the present invention.

Referring to FIG. 2a, the communication channel (200), including both the receive and transmit frequencies, is generally divided into repetitive time frames (205) that are further divided into a plurality of time slots (210). The time slots (210) are used for transmission of inbound and outbound data packets. In the preferred embodiment, when no reserved inbound user data packet is currently being transmitted in a time slot (210), that inbound time slot may be used by communication units (101) to transmit random access control packets for the purpose of reserving a subsequent time slot (210) in which to transmit a data packet. Alternatively, the slots may be used for the transmission of unreserved data packets.

Figure 2B:
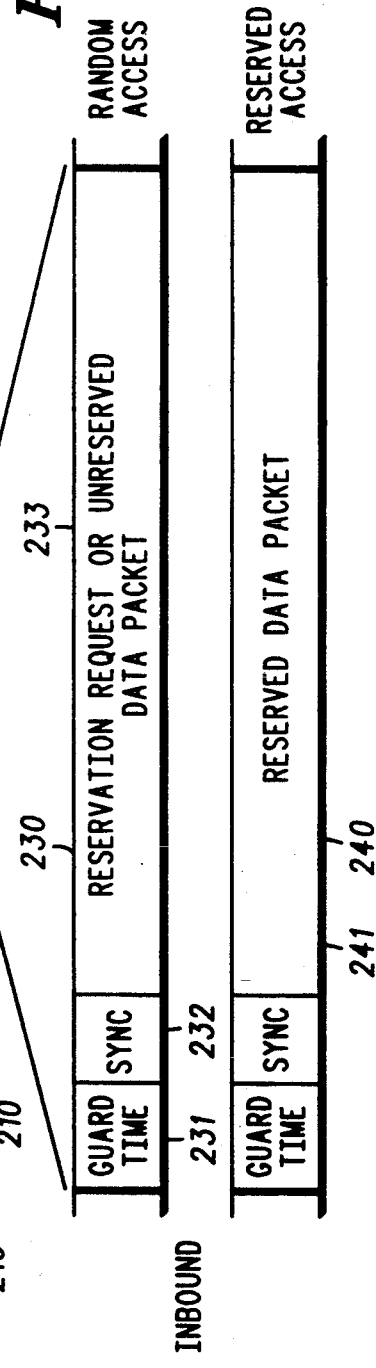

FIG. 2b shows exemplary time slot formats for the inbound communication channel according to the preferred embodiment. When a channel is available for random access, the inbound time slots are used as random access slots (230). The random access slots (230) include a guard time field (231) to avoid interference between adjacent time slots. A sync field (232) provides information to enable proper slot and bit timing to be recovered at the RF receiver (131). The remainder of the packet may then be used for the transmission of a reservation packet or an unreserved data packet. (233).

The reservation packet comprises a control message that indicates to the receiving base station (130) that the RF modem (110) has a data packet to send using reserved access. An RF modem desiring to transmit a data packet in this mode will transmit a reservation packet in the random access slot (230), according to the access control algorithm of the present invention. The reservation packet contains at least an identifier and information regarding data packet length. The identifier permits the base station to identify the requesting communication unit (101). Data packet length relates to the size of the packet that the RF modem desires to send. The base station can use this information to determine how many time slots are required for transmission of the packet.

Upon receiving a valid reservation packet, time slot (210) configuration may be switched from random access to reserved access format (240). Guard time and sync fields are again provided. A data packet field (241) contains the user data information to be delivered to the host computer (140). (The size of the user data information may dictate that several reserved access time slots (240) are required to completely transmit the packet. To accommodate messages requiring more than one reserved access time slot, one or more time slots may be reserved in multiple frames.) The reserved time slots maintain the reserved access configuration (240) until the transmission of the data packet is complete, after which the time slots revert to the random access format.

Whenever a time slot is designated for reserved access, only the single communication unit (101) for whom the time slot was reserved is permitted to transmit packets in that time slot. Other units wishing to access the channel during this time are inhibited, and may attempt access to the channel only when the slot is re-designated as random access.

As noted above, a random access time slot (230) can also be used to transmit a single packet or user data information in the reservation request field (233). An RF modem desiring to send a data packet without a reservation may transmit an unreserved data packet in the random access slot (230). When a valid unreserved data packet is received at the base station (130), it is processed as received user data, and the time slot (210) configuration continues to be random access. Whenever a time slot is designated for random access, any of the plurality of communication units (101) are permitted to transmit reservation or unreserved data packets in that time slot, as described below in more detail.

Figure 2C:
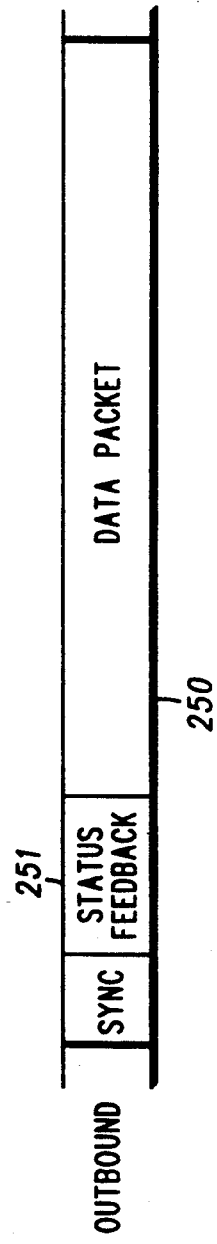

Referring to FIG. 2c, the outbound time slot format (250) includes a sync field, status feedback field (251), and a data packet field. The sync field supports the same purpose as that described in association with the inbound channel configurations. The data packet field comprises user data information from the host computer (140). The status feedback field (251) comprises information that supports the operation of the inbound channel access protocol. The status feedback information is sourced by the base station controller (135) and reflects the current state of at least one of the inbound time slots, either random access or reserved access. If the channel state is reserved, the status feedback information further includes a communication unit identifier that permits communication units (101) to uniquely determine their slot assignments. This indicator is also used in the access control algorithm to determined when random access may be attempted, as described below.

The access control algorithm according to the present invention utilizes at least one time clock (and preferably two) in the communication unit. This time clock may include a real-time clock as depicted, or may be a counter or any other suitable device or software algorithm within the controller (115), to indicate or otherwise allow the calculation of the passage of time. The clock is used to keep track of those times when the communication resource is unavailable for random access, because of reserved communications. This information is then used to control subsequent random access to the resource by the communication unit when the resource does become available.

Figure 3:
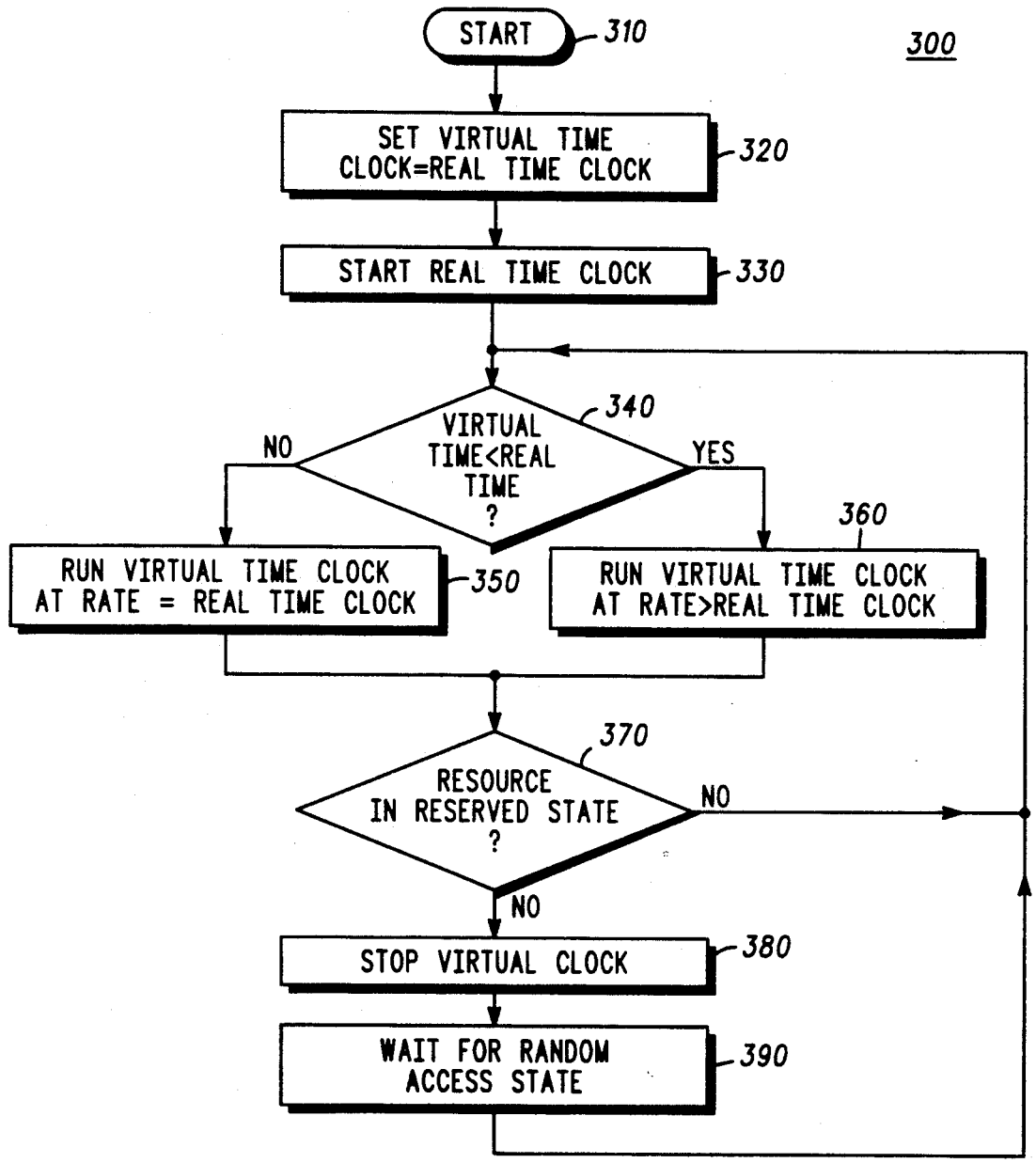
FIG. 3 is an operation flow chart showing the operation of the real-time and virtual-time clocks in the channel access algorithm of the RF modem of FIG. 1 according to the present invention.

Referring to FIG. 3, the operation and use of the access control clocks in the communication units (115), in conjunction with the flow chart 300, is described for the preferred embodiment. In the communication unit, there are two time clocks hereafter referred to as the virtual time clock and the real time clock. Initially, the times on the two clocks are set to be equal (320). The real time clock runs continuously at a constant rate (330). The virtual time clock runs at the same rate as the real time clock (350), except in those cases where it is determined to have fallen behind the real time clock (340), in which case it operates at a rate greater than the real time clock rate (360).

The controller monitors the outbound resource for reservation assignments. From these, the controller can determine that an inhibit condition will occur (i.e., the communication resource will soon be used by another communication unit). Eventually, the communication resource will be place in the reserved access state, and the controller will detect this condition. The state of the virtual time clock is controlled such that when the resource is determined to be in the reserved access state (370), the virtual time clock is stopped (380). The real time clock, meanwhile, keeps running, so that the virtual time clock falls behind the real time clock by an amount corresponding to the reserved period. When the reserved period ends, and the resource is again available for random access (390), the virtual time clock is started again, and runs at the appropriate rate determined by block 340.

During the time that the resource is in a reserved state, and the virtual time clock is stopped, all random access packets that would otherwise be sent during this period are inhibited from being transmitted. All communication units in the system operate in the same manner. Therefore, the total time that the virtual time clocks fall behind due to reserved periods represents a system-wide backlog of pending random access packets. If all the pending random access packets were to be transmitted as soon as the channel returned to the random access state, they would all collide. Instead, according to the present invention, the backlog may be cleared in an orderly, first-come, first-served manner. When a packet arrives at the RF modem, the value of the real time clock is noted and stored. If the virtual time clock value is less than this time, packet transmission is inhibited. The virtual time clocks begin running as soon as the channel becomes available for random access. The communication units are then allowed to transmit their pending random access packets only when the virtual time equals the stored real time at which the packets were to be sent. In order for the virtual time clock to eventually catch up with the real time clock, it must run at an increased rate until it is caught up. In this manner, the packets generated during the inhibit interval are transmitted, over a generally compressed interval, when the resource becomes available again. Importantly, the original ordering of packet transmissions throughout the system is maintained in a distributed manner, and random rescheduling delays are not required.

Figure 4:
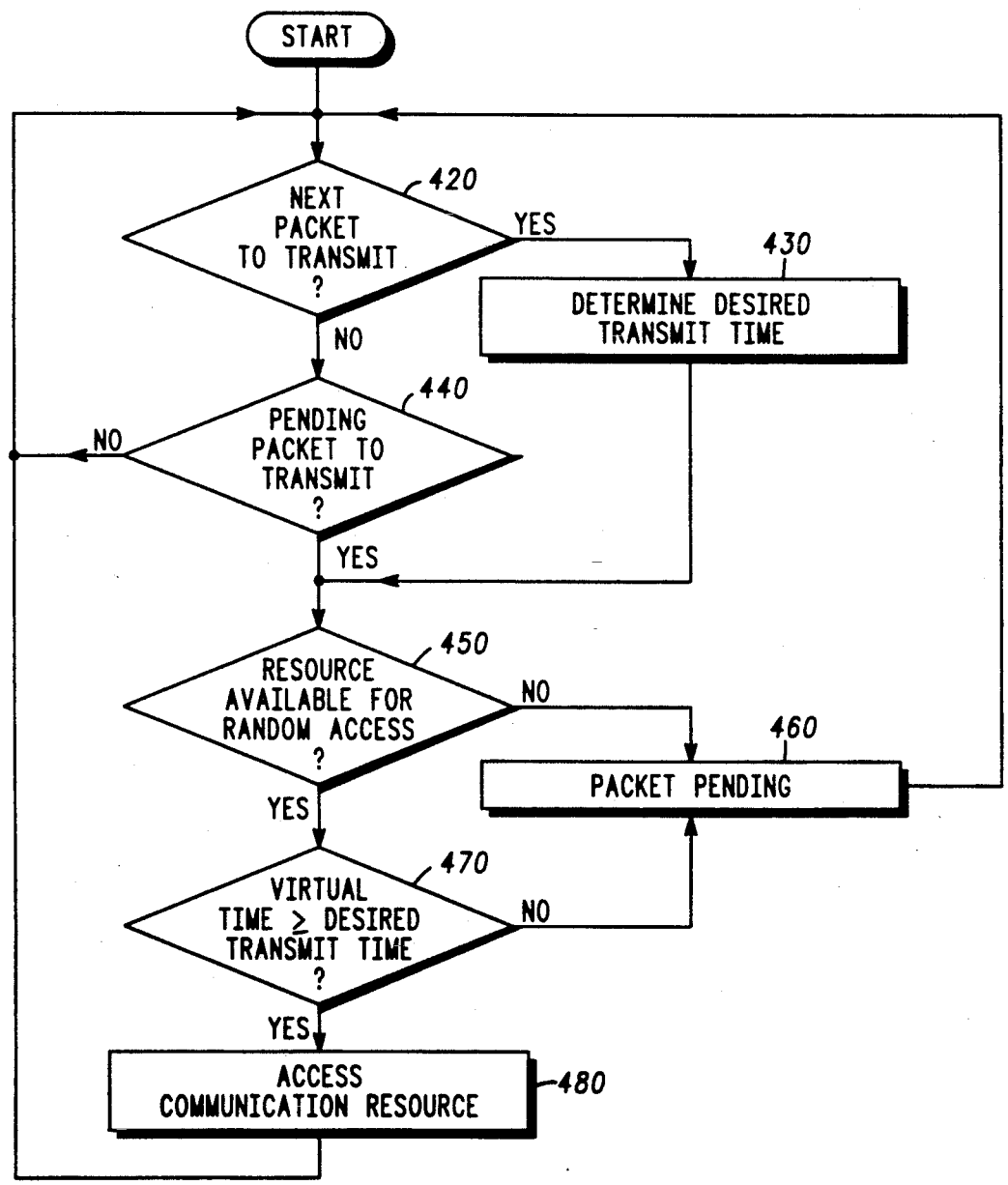
FIG. 4 is an operation flow chart of the channel access procedure of the RF modem of FIG. 1 according to the present invention.

Along these lines, and referring to FIG. 4, the particular operation (400) of the communication unit controller (115) will be described for the process of accessing the resource. The controller begins by detecting when the communication unit has a new random access packet to send (420). (This packet may be either a reservation request or an unreserved data packet.) When this occurs, the desired transmit time (i.e., the current time) of the packet is noted (430). This time represents the time that the packet transmission would have been attempted, if not for present or past periods during which random access was inhibited. If no new packets are present the controller determines whether any previously unsent packets are still pending (440). If not, the process reinitiates. When, however, a current or pending packet exists, the unit determines availability of the communication resource for random access (450). If not available, the transmission is inhibited and the packet put on pending status (460). If the resource is available for random access, the unit then compares the desired transmit time for the packet to the time on the virtual time clock (470). If the virtual time is less than the desired transmit time, this indicates that the system backlog time, created during periods of random access unavailability, has not yet advanced a sufficient amount to allow transmission of the packet. The packet transmission is therefore inhibited, and put on pending status (460). The communication unit continues to monitor the status of pending packets (440) until the resource is available for random access, and the virtual time is equal to or greater than the desired transmit time. At this point access to the shared communication resource may be attempted (480).

Another embodiment of the present invention includes dynamic selection of the virtual time clock rate. The selected virtual time clock rate may be in part a function of detected activity on the communication channel or other appropriate observations of communication system behavior. The selection of the virtual clock rate may be effected by the communication unit controller (115) or by the base station controller (135). When selection is made by the base station controller (135), appropriate control data is transmitted to the communication unit (101) to inform the communication unit controller (115) of the selected virtual clock rate.

Another embodiment includes provision for updating the real time and virtual time clock values in the communication unit by the base station controller (135). In some communication systems, all of the communication units (101) can not observe all of the communication activity continuously. This may be the result of communication outages due to fading or intervals during which the communication unit is powered off. To obtain all of the benefits of the present invention, all communication units (101) should have a substantially similar knowledge of the state of the backlog of the communication system. Nevertheless, due to outage periods, it is possible for some of the communication units to have substantially incorrect knowledge of the backlog state as gained through observation of the communication activity. Therefore, it is beneficial in these circumstances for the base station controller (135) to maintain a real time clock and virtual time clock in a substantially similar manner to that described for the communication unit controller (115). These base station clocks would serve as the master clocks for the communication system (100). Via appropriate control messages transmitted quasiperiodically by the base station, the current values of the master clocks can be communicated to the communication units (101). These values are then used to set the respective clocks of the communication unit, thus insuring a substantially similar knowledge of the state of the backlog of the communication system.

In yet another embodiment, only the difference between the master real time clock and the master virtual time clock is communicated to the communication units (101).

Figure 5:
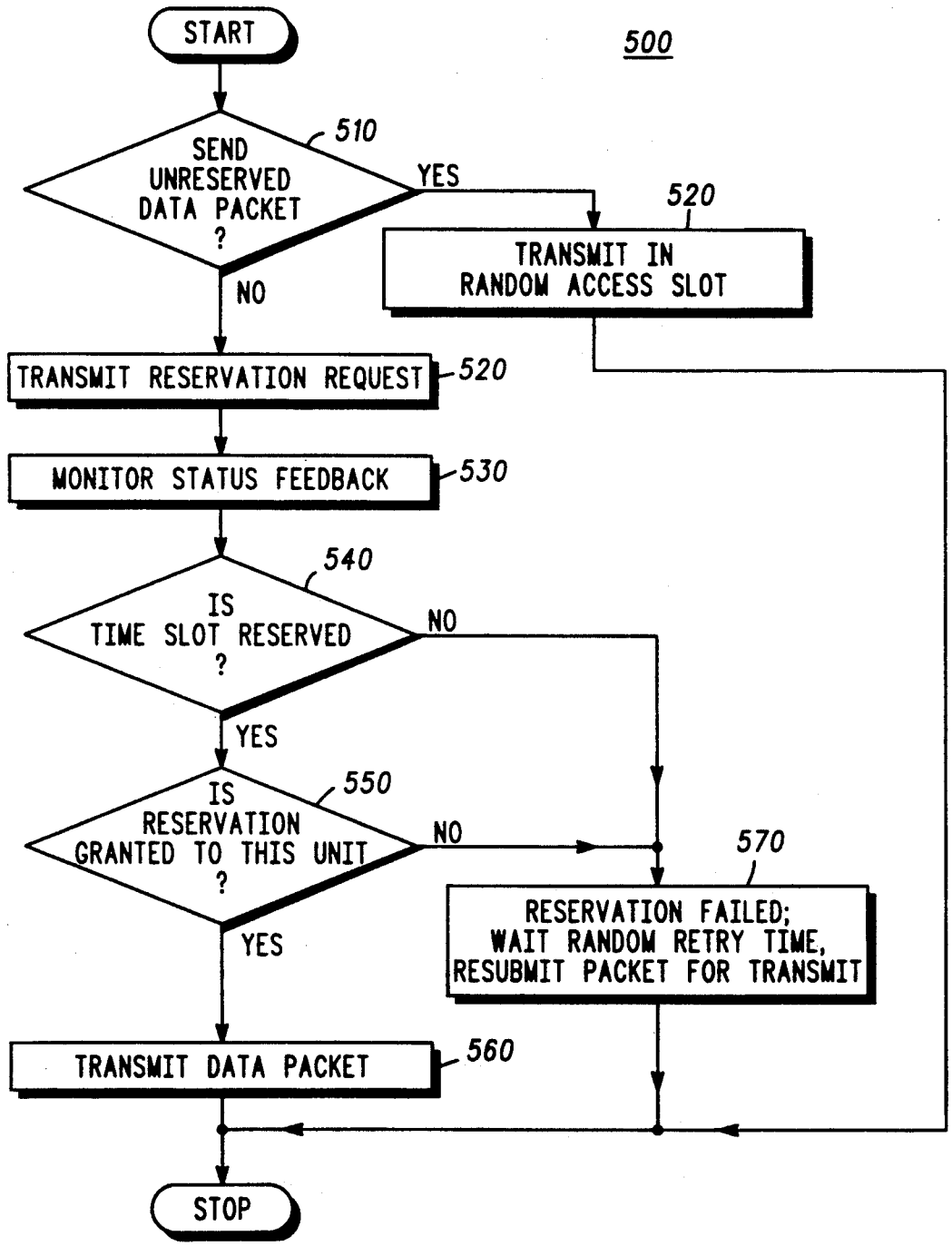
FIG. 5 is an operation flow chart of the RF modem of FIG. 1 according to the present invention.

Referring to FIG. 5, the operation (500) of the communication unit controller (115) will now be described for the process of sending a packet after access to the resource has been obtained.

The controller takes different actions depending on whether it intends to send a reservation request or an unreserved data packet (510). This determination may be made on the basis of data packet size or appropriate control signals received from the user. If an unreserved data packet is to be sent, the controller transmits the unreserved data packet in the available random access time slot (520).

If a reservation request is to be sent, the controller transmits instead the reservation request (520). The controller then begins to monitor status feedback fields on the outbound communication channel (530). First it determines if the time slot is now reserved (540). If not, the reservation attempt has failed, and after waiting an appropriate length of time (570), the data packet is resubmitted for access to the channel. If the time slot is reserved, the identifier portion of the status feedback field is examined to determine if the reservation has been granted to this communication unit (550). If the time slot is reserved for this unit, the user data packet may then be transmitted in the reserved time slot (560). If the reservation is not for this unit, the reservation attempt has failed and the controller proceeds (570) to resubmit the data packet.

Figure 6:
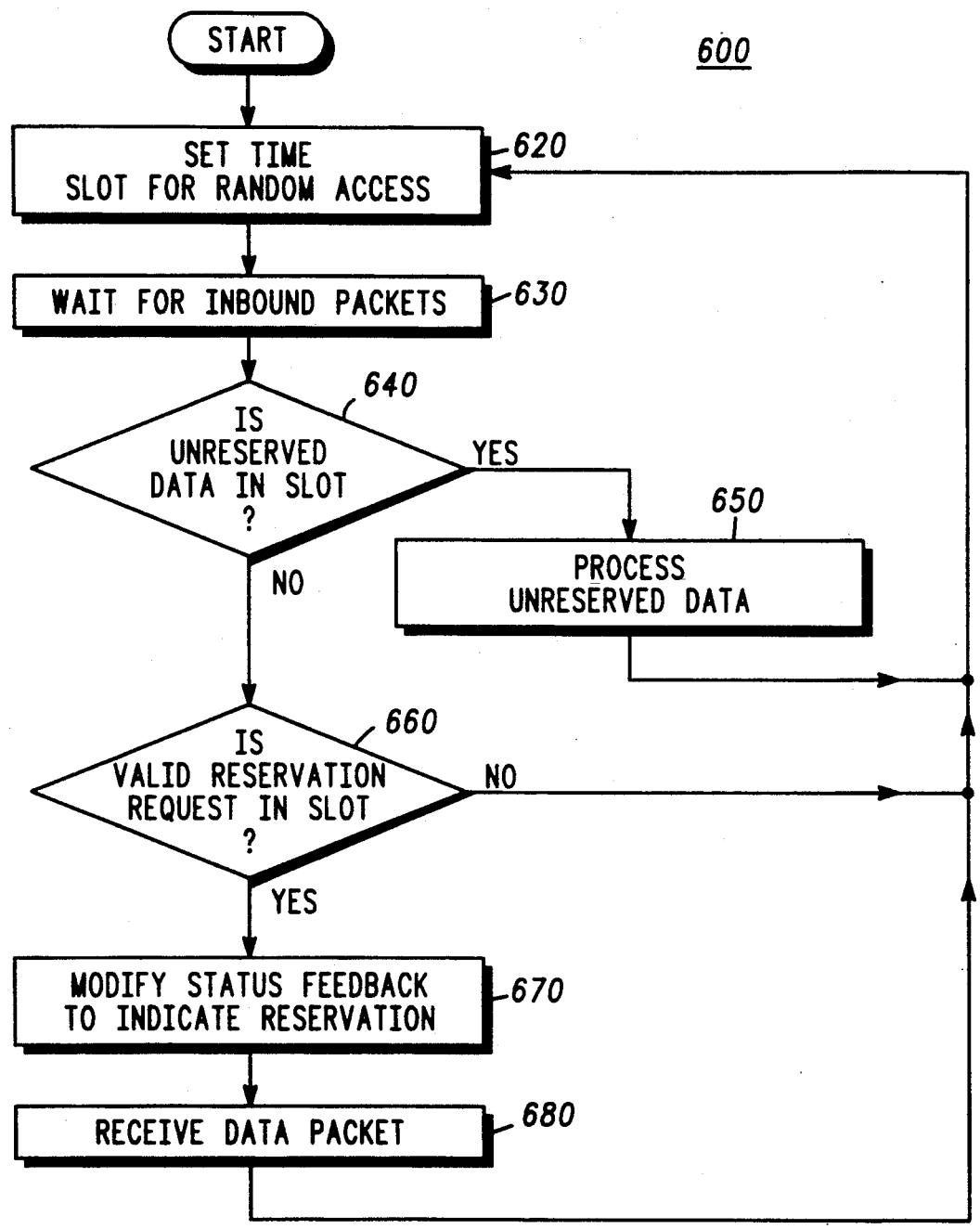
FIG. 6 is an operation flow chart of the base station of FIG. 1 according to the present invention.

Referring to FIG. 6, the operation (600) of the base station controller (135) will now be described. The controller begins by configuring the inbound time slot for random access (620). The controller then waits to receive inbound random access data transmissions from the communication units (630). When data is received in the random access slot, the controller determines if they are valid unreserved user data transmissions (640). If so, the controller processes the user data (650). If not, it then goes on to process any reservation requests.

If no requests were received, the controller returns (620) to receive future requests or unreserved data transmissions. If a valid request was received (660), the requesting unit is provided with a reservation. The current status feedback is then formatted (670) to indicate the new reservation. The status feedback is transmitted on the outbound communication channel, enabling the communication unit (101) to transmit the reserved access data packet, which is then received by the base station (680).

After the data packet is completely received, no more reservations are currently required. The controller then returns (620) and restores the time slot to random access to enable new reservation requests or unreserved data packets to be received.

Accordingly, the present invention operates to provide orderly and efficient access to a shared TDM communication channel by a plurality of communication units (101). This is done by maintaining a clock (or clocks) in the communication unit, and detecting the time when an inhibit period on the shared communication resource begins, and the time at which it concludes. In addition, the time at which the communication unit desires to access the resource is determined. This information provides a useful metric regarding use of the system, from which one may make useful assumptions regarding the total system backlog of pending packets, and of the relative position in the system backlog a given packet occupies. This information is then used to control access to the channel in an orderly, first-come, first-served basis.

What is claimed is:

1. A method of accessing a shared communication resource, comprising the steps of:
    in a communication unit:
    A) maintaining a clock;
    B) determining that an inhibit condition on the shared cummunication resource will occur, and then determining when the inhibit condition begins;
    C) determining when the inhibit condition concludes;
    D) determining when access to the shared communication resource by the communication unit is desired;
    E) attempting to access the shared communication resource as a function of:
        i) the beginning and concluding times of at least one of the detected inhibit conditions; and
        ii) when access to the shared communication resource was desired.

2. The method claim 1, wherein step B includes the steps of:
    B1) determining when the communication resource is scheduled for a reserved state;
    B2) when the communication resource begins the reserved state, determining that the inhibit condition exists.

3. The method of claim 1, wherein step E includes the steps of:
    E1) determining whether the communication resource is available for random access;
    E2) upon determining that the communication resource is available for random access, determining whether to request a reserved time slot;
    E3) upon determining to request a reserved time slot, transmitting a request for at least one reserved time slot.

4. A method of transmitting a data packet on a shared communication resource, comprising the steps of:
    in a communication unit:
    A) maintaining a clock;
    B) determining that an inhibit condition on the shared communication resource will occur, and then determining when the inhibit condition begins;
    C) detecting when the inhibit condition concludes;
    D) determining when transmission of a data packet on the shared communication resource by the communication unit is desired;
    E) attempting to transmit a data packet on the shared communication resource as a function of:
        i) the beginning and concluding times of at least one of the detected inhibit conditions; and
        ii) when transmission on the shared communication resource was desired.

5. The method of claim 4, wherein step B includes the steps of:
    B1) determining when the communication resource is scheduled for a reserved state;
    B2) when the communication resource begins the reserved state, determining that the inhibit condition exists.

6. The method of claim 4, wherein step E includes the steps of:
    E1) determining whether the communication resource is available for random access;
    E2) upon determining that the communication resource is available for random access, choosing whether to request a reserved time slot, or transmit an unreserved data packet;
    E3) upon choosing to request a reserved time slot, transmitting a request for at least one reserved time slot in a random access slot, then
    E4) determining whether the communication resource is available for reserved access, then
    E5) upon determining that the communication resource is available for reserved access, transmitting the data packet in said at least one reserved time slot;
    E6) upon choosing to transmit an unreserved data packet, transmitting the unreserved data packet in the random access slot.

7. A method of accessing a shared communication resource, comprising the steps of:
    in a communication unit:
    A) maintaining a clock;
    B) determining that an inhibit condition on the shared cummunication resource will occur, and then determining when the inhibit condition begins;
    C) detecting when the inhibit condition concludes;
    D) determining when access to the shared communication resource by the communication unit is desired;
    E) when access to the shared communication resource by the communication unit is desired, determining whether a current inhibit conditiion exists;
    F) when a current inhibit condition exists, detecting when the current inhibit condition concludes, then
    G) attempting to access the shared communication resource as a function of:
        i) the beginning and concluding times of at least one of the detected inhibit conditions; and
        ii) when access to the shared communication resource was desired;

H) when a current inhibit condition does not exist, determining whether a prior inhibit condition has been detected;

I) when a prior inhibit condition has been detected, attempting to access the shared communication resource as a function of:
   i) the beginning and concluding times of at least one of the detected inhibit conditions; and
   ii) when access to the shared communication resource was desired;

J) when a prior inhibit condition has not been detected, attempting to access the shared communication resource.

8. A method of accessing a shared communication resource, comprising the steps of:
   in a communication unit:
   A) maintaining a real time clock and a virtual time clock;
   B) determining that an inhibit condition on the shared communication resource will begin, and when the inhibit condition begins, suspending the virtual time clock in response thereto;
   C) detecting when the inhibit condition concludes, and resuming operation of the virtual time clock in response thereto;
   D) determining a time when access to the shared communication resource by the communication unit is desired;
   E) attempting to access the shared communication resource as a function of when the virtual time clock has a predetermined relationship with respect to the time when access to the shared communication resource by the communication unit was desired.

9. The method of claim 8, wherein step C includes the steps of:
   C1) resuming operation of the virtual time clock at a rate greater than the real time clock;
   and further the step of:
   C2) determining when the virtual time clock equals the real time clock, and operating the virtual time clock at a rate equal to the real time clock in response thereto.

10. The method of claim 9, wherein step C1 includes the steps of:
    C1a) selecting a virtual time clock rate greater than the real time clock rate;
    C1b) operating the virtual time clock at the selected rate.

11. The method of claim 10, wherein step C1a includes the steps of:
    in a communication receiver:
    C1ai) receiving messages from a plurality of communication units using a shared communication resource;
    C1aii) selecting a virtual time clock rate, greater than or equal to the real time clock rate, as a function in part of messages received from the communication units;
    C1aiii) indicating the selected virtual time clock rate to the plurality of communication units.

12. The method of claim 8, wherein step C includes the step of:
    C1) on a non-periodic basis, receiving a transmission indicating a difference between time values of a virtual time clock and real time clock.

13. The method of claim 8, wherein step C includes the step of:
    C1) on a non-periodic basis, receiving time values of a virtual time clock and real time clock.

* * * * *

UNITED STATES PATENT AND TRADEMARK OFFICE
CERTIFICATE OF CORRECTION

PATENT NO. : 5,142,533
DATED : August 25, 1992
INVENTOR(S) : Kenneth J. Crisler, et. al.

It is certified that error appears in the above-indentified patent and that said Letters Patent is hereby corrected as shown below:

On the Title page, item [57], Abstract, delete "(10" and insert therefor-- (101)--.

Column 10, line 58, the word "conditiion" should be --condition--.

Signed and Sealed this

Twenty-eighth Day of September, 1993

Attest:

BRUCE LEHMAN

Attesting Officer

Commissioner of Patents and Trademarks